3,637,638
RESINS FROM MALEOPIMARIC ACID AND PRIMARY AMINES
Martin F. Sloan, Brandywood, Wilmington, Del., assignor to Hercules Incorporated, Wilmington, Del.
No Drawing. Continuation-in-part of application Ser. No. 710,756, Mar. 6, 1968. This application May 28, 1970, Ser. No. 41,644
Int. Cl. C09f 1/04, 1/06
U.S. Cl. 260—102
9 Claims

ABSTRACT OF THE DISCLOSURE

Novel resinous compounds useful in manufacture of printing inks are prepared from maleopimaric acid and primary amines.

---

This application is a continuation-in-part of my copending application Ser. No. 710,756 filed Mar. 6, 1968, now abandoned.

This invention relates to novel resinous compounds which are reaction products of at least one primary amine and a substantially pure adduct of rosin, such as maleopimaric acid; and to their method of preparation. The novel reaction products of this invention have particular utility in the manufacture of printing ink.

The primary amines employed in this invention have the formula $$R\text{---}NH_2 \qquad (I)$$

wherein R is selected from the group consisting of the dehydroabiety radical, the hydroabietyl radical, an aryl radical, straight and branched chain aliphatic radicals having from about 14 to about 18 carbon atoms, and cyclic aliphatic radicals.

The primary amine wherein R is the dehydroabiety radical is dehydroabiety amine.

The primary amine wherein R is the hydroabiety radical is hydrobietyl amine.

Illustrative primary amines of Formula I wherein R is an aryl radical include aniline, metal toluidine, ortho toluidine, para toluidine, the xylidines, and the like.

Illustrative primary amines of Formula I wherein R is a straight or branched chain aliphatic radical having from about 14 to about 18 carbon atoms, or a cyclic aliphatic radical include tetradecyl amine, 3,5-dimethyl tetradecyl amine, hexadecyl amine, octadecyl amine, myristyl amine, cetyl amine, stearyl amine, oleyl amine, cyclohexyl amine, cyclooctyl amine, cyclododecyl amine, and the like.

Mixtures of two or more of any of the primary amines can be employed if desired.

The rosin adducts used in this invention are substantially pure, and are essentially free of non-adducted rosin acids. It is known to adduct rosin with an acidic material such as maleic anhydride or fumaric acid to provide a reaction mixture comprised of adducted and non-adducted rosin acids. The predominant adduct formed in the reaction of rosin and maleic anhydride is maleopimaric acid. The predominant adduct formed in the reaction of rosin and fumaric acid is fumaropimaric acid. These rosin adducts can be separated from their respective crude rosin adducts in substantially pure form by methods known in the art. For example, a process for separation of maleopimaric acid in substantially pure form from the crude rosin adduct resulting from reaction of rosin and maleic anhydride is set forth in U.S. 2,628,626. A process for separation of fumaropimaric acid from the crude rosin adduct resulting from the reatcion of rosin and fumaric acid is set forth in U.S. 2,889,362.

The adducts used in this invention are maleopimaric acid, fumaropimaric acid, and mixtures thereof with their isomers. Mixtures of maleopimaric acid and fumaropimaric acid can be satisfactorily employed to provide mixtures of reaction products. The rosin adducts employed are essentially free of non-adducted resin acids present in rosin. While a small amount of resin acids can be tolerated, it is preferred that the amount thereof that is present be kept at a minimum, preferably not exceeding about 5% by weight based on the weight of the rosin acid adducts employed.

The lower alkyl esters of maleopimaric acid and fumaropimaric acid, such as dimethyl maleopimarate and diethyl fumaropimarate, can be used in carrying out this invention and are the full equivalents of the acids in reaction with the primary amine.

The reaction products of this invention are derived by reacting, at an elevated temperature on the order of from aobut 200° C. to about 350° C., from one mole to three moles of primary amine and one mole of an adducted rosin acid, such as maleopimaric acid. Different reaction products will result depending on the molar ratio of reactants employed. Preferred reaction temperatures will be from about 250° C. to about 280° C. Reaction time varies inversely with temperature and will usually be from about 2 hours to 24 hours. The reaction products of this invention are resinous compositions. These resinous compositions are viscous liquids or solids depending on the reactants and the amounts thereof employed. It is within the skill of those versed in the art to determine when reaction is substantially complete.

As above set forth different reaction products are produced depending on the mole ratio of reactants employed.

Thus, for example the reaction product of one mole of amine, R—NH$_2$, and one mole of maleopimaric acid can be represented by Formula II.

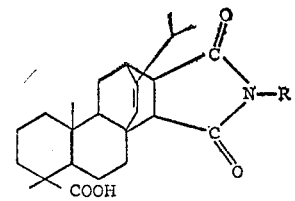

(II)

The reaction product of two moles of amine R—NH$_2$ and one mole of maleopimaric acid can be represented by Formula III.

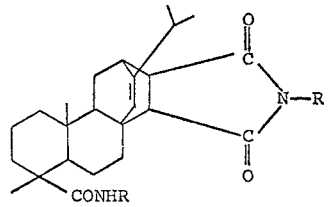

(III)

The reaction product of three moles of amine R—NH$_2$ and one mole of maleopimaric acid can be represented by Formula IV.

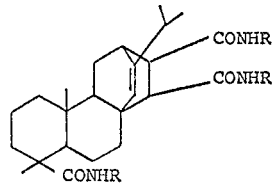

(IV)

While the reaction product designated by Formulas II, III, and IV, above is the principal product formed by controlling the mole ratio of reactants, it is to be understood that mixtures of these products can be present with any mole ratio of reactants employed.

The following examples more fully illustrate the resinous compositions of this invention and the process for their preparation. In these examples all parts and percentages are by weight unless otherwise specified.

Example I which follows illustrates preparation of a resinous composition of this invention starting with one mole of substantially resin acid free adducts of rosin and maleic anhydride and two moles of dehydroabietyl amine.

EXAMPLE I

A stirred reaction vessel is charged with 100 parts of substantially resin acid free adducts of rosin with maleic anhydride, containing a substantial amount of maleopimaric acid and the isomers thereof and having an average acid number of 264, an average saponification number of 390.8 and containing about 3% of resin acids and 165 parts of dehydroabietyl amine. The resulting mixture is heated to 275° C. in about 20 minutes. The mixture is held at 275° C. for about 3 hours and 45 minutes and a vacuum of about 6.0 mm. of Hg is then applied to the resulting reaction mass. Heating of the reaction mass under vacuum is continued for about 2 hours. The reaction mass is allowed to cool and a resinous composition is recovered having an average acid number of 13, an average amine number of 14.5, and a drop softening point of 155° C. The resinous composition is soluble in benzene, toluene, xylene, and liquid aliphatic hydrocarbons.

The following example illustrates preparation of a resinous composition from one mole of substantially pure maleopimaric acid and two moles of dehydroabietylamine.

EXAMPLE II

A stirred reaction vessel is charged with 100 parts of maleopimaric acid and 157.5 parts of dehydroabietyl amine. The resulting mixture is heated to 275° C. in 72 minutes. The mixture is held at 275° C. for about 6 hours. A vacuum of 0.25 mm. Hg is then applied to the resulting reaction mass to aid in removal of water formed during the reaction. Heating under vacuum is continued for an additional 3 hours. The reaction mass is allowed to cool and a resinous composition is recovered having an average acid number of 17, an average amine number of 8, and a drop softening point of 185° C. The resinous composition is soluble in benzene, toluene, xylene, and liquid aliphatic hydrocarbons.

The following example illustrates preparation of a resinous composition prepared from one mole of substantially pure maleopimaric acid and two moles of oleylamine.

EXAMPLE III

A stirred reaction vessel is charged with 100 parts of maleopimaric acid and 156 parts of oleylamine. The resulting mixture is heated to 275° C. in 53 minutes. The mixture is held at 275° C. for about 3½ hours and then a vacuum of about 0.25 mm. of Hg is applied to the resulting reaction mass. Heating the reaction mass under vacuum is continued for about 1¼ hours. The reaction mass is allowed to cool and a resinous composition is recovered which is a very viscous liquid with an average acid number of 20 and an average amine number of 8.

The following example illustrates preparation of a resinous composition from one mole of substantially pure maleopimaric acid and three moles of dehydroabietyl amine.

EXAMPLE IV

A stirred reaction vessel is charged with 50 parts of maleopimaric acid and 120 parts of dehydroabietyl amine (5 weight percent excess over three equivalents). The resulting mixture is heated to 275° C. in 35 minutes. Heating of the mixture is continued at 275° C. for about 3¼ hours. Vacuum is then applied to the resulting reaction mass to aid in removal of water formed during the reaction. Heating of the reaction mass under vacuum is continued for 130 minutes. The reaction mass is allowed to cool and a resinous composition is recovered which has an average acid number of 5.3, an average amine number of 31, and a drop softening point of 128° C.

The following example illustrates preparation of a resinous composition from one mole of rosin-fumaric acid adducts containing less than 5% resin acids and two moles of dehydroabietyl amine.

EXAMPLE V

About 75 parts of substantially resin acid free adducts of rosin with fumaric acid containing a substantial amount of fumaropimaric acid and the isomers thereof and having an average acid number of 377, an average saponification number of 390 and containing 0.9% resin acids is admixed with 111 parts (5% excess over two moles) of dehydroabietyl amine. The admixture is heated at 270° C. until the acid number reaches 32. Vacuum is applied to the admixture for 3¼ hours. The resulting resinous composition recovered has an average acid number of 26, an average amine number of 3.6 and a drop softening point of 165° C. The resinous composition is soluble in benzene, toluene, xylene and liquid aliphatic hydrocarbons.

The following example illustrates preparation of a resinous composition from fumaropimaric acid and one mole of a rosin amine.

EXAMPLE VI

About 50 parts of fumaropimaric acid and 38.4 parts of dehydroabietyl amine is admixed and heated at 250° C. until the acid number of the admixture reaches 81. Vacuum is then applied to the admixture for 2½ hours. The resinous composition recovered has an average acid number of 79, and a drop softening point of 187° C. The resinous composition is soluble in benzene, toluene, and xylene, and in aliphatic hydrocarbons.

The following example illustrates preparation of a resinous composition from one mole of separated rosin-maleic anhydride adduct and one mole of aniline.

EXAMPLE VII

About 70 parts of substantially resin acid free adducts of rosin and maleic anhydride containing a substantial amount of maleoprimaric acid and having an average acid number of 264, an average saponification number of 390.8 and containing about 3% resin acids and 16 parts of aniline are charged to a stirred reaction vessel maintained under a nitrogen atmosphere. The resulting mixture is heated at 300–305° F. for thirty minutes. Vacuum (water aspirator) is applied to the heated mixture for 15 minutes. The mixture is cooled and a resinous composition is recovered having an average acid number of 117, a drop softening point above 245° C. and an average amine number of less than two.

The following example illustrates the preparation of a rotagravure ink utilizing the resinous composition prepared in Example I.

EXAMPLE VIII

About 10 parts of chrome yellow pigment is dispersed directly into about 40 parts of the resinous composition prepared in Example I, using a two roll rubber mill. The resulting pigmented resin chips are dissolved in 50 parts of a high boiling hydrocarbon distillate having a boiling point range of from 468° F. to 510° F., and a specific gravity of 0.806. The resulting solution is a highly satisfactory rotagravure ink.

In preparing the resinous compositions of this invention it is preferable to conduct the reaction in an inert atmosphere, such as under a nitrogen blanket, to avoid oxidation of the reactants and the resulting resins to undesirable side products.

It is to be understood that the above specification is illustrative of this invention, and not in limitation thereof.

What is claimed is:

1. A resinous composition comprising the product of reaction of
   (A) a material selected from the group consisting of maleopimaric acid, fumaropimaric acid, the lower alkyl esters of the above, and mixtures thereof with their isomers, and
   (B) a primary amine of the formula R—NH$_2$ wherein R is selected from the group consisting of the dehydroabietyl radical, the hydroabietyl radical, an aryl radical, straight and branched chain aliphatic radicals having from about 14 to about 18 carbon atoms, and cyclic aliphatic radicals wherein the mole ratio of (A) to (B) is from 1/1 to 1/3, said reaction being carried out at a temperature of from about 200° C. to about 350° C.

2. The resinous composition of claim 1 wherein (A) is maleopimaric acid and (B) is dehydroabietyl amine.

3. The resinous composition of claim 1 wherein (A) is fumaropimaric acid, and (B) is dehydroabietyl amine.

4. The resinous composition of claim 1 wherein (A) is a mixture of maleopimaric acid, fumaropimaric acid and their isomers, and (B) is dehydroabietyl amine.

5. The resinous composition of claim 1 wherein (A) is maleopimaric acid, and (B) is oleyl amine.

6. The resinous composition of claim 1 wherein (A) is maleopimaric acid, and (B) is aniline.

7. The resinous composition of claim 1 wherein the reaction is carried out at a temperature of from about 250° C. to about 280° C.

8. The method of preparing a resinous composition comprising the steps of
   (1) admixing a material selected from the group consisting of maleopimaric acid, fumaropimaric acid, the lower alkyl esters of the above, and mixtures thereof with their isomers with a primary amine of the formula R—NH$_2$, wherein R is selected from the group consisting of the dehydroabietyl radical, the hydroabietyl radical, an aryl radical, straight and branched chain aliphatic radicals having from about 14 to about 18 carbon atoms, and cyclic aliphatic radicals, and
   (2) heating the admixture at a temperature of from about 200° C. to about 350° C. for a time sufficient to provide a resinous composition.

9. The method of claim 8 wherein the reaction temperature is from about 250° C. to about 280° C.

References Cited

UNITED STATES PATENTS 2,412,708    12/1946    Blair _____ 260—100

HOSEA E. TAYLOR, Primary Examiner

W. E. PARKER, Assistant Examiner

U.S. Cl. X.R.

106—30; 260—313.1, 326, 557